Patented Oct. 7, 1941

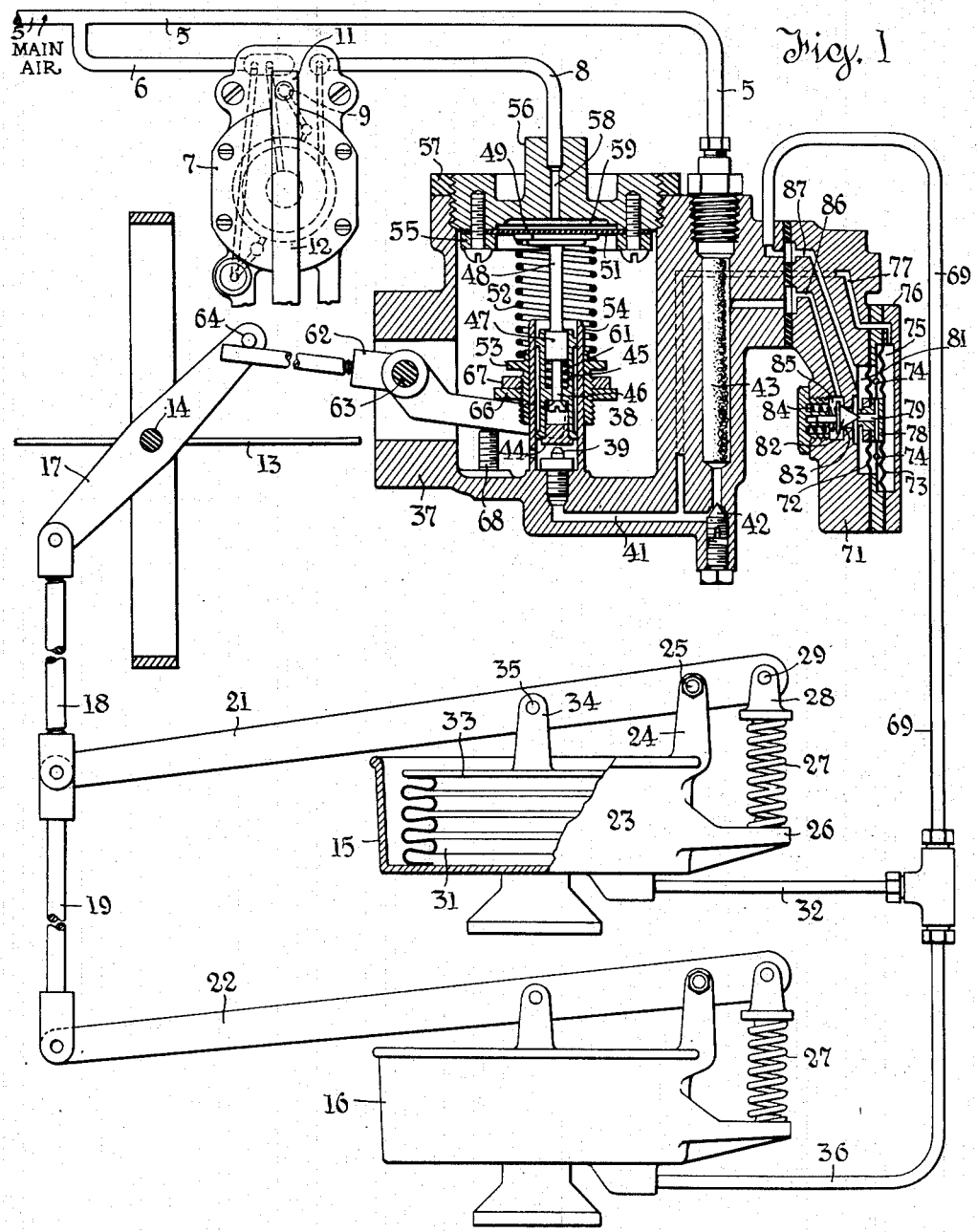

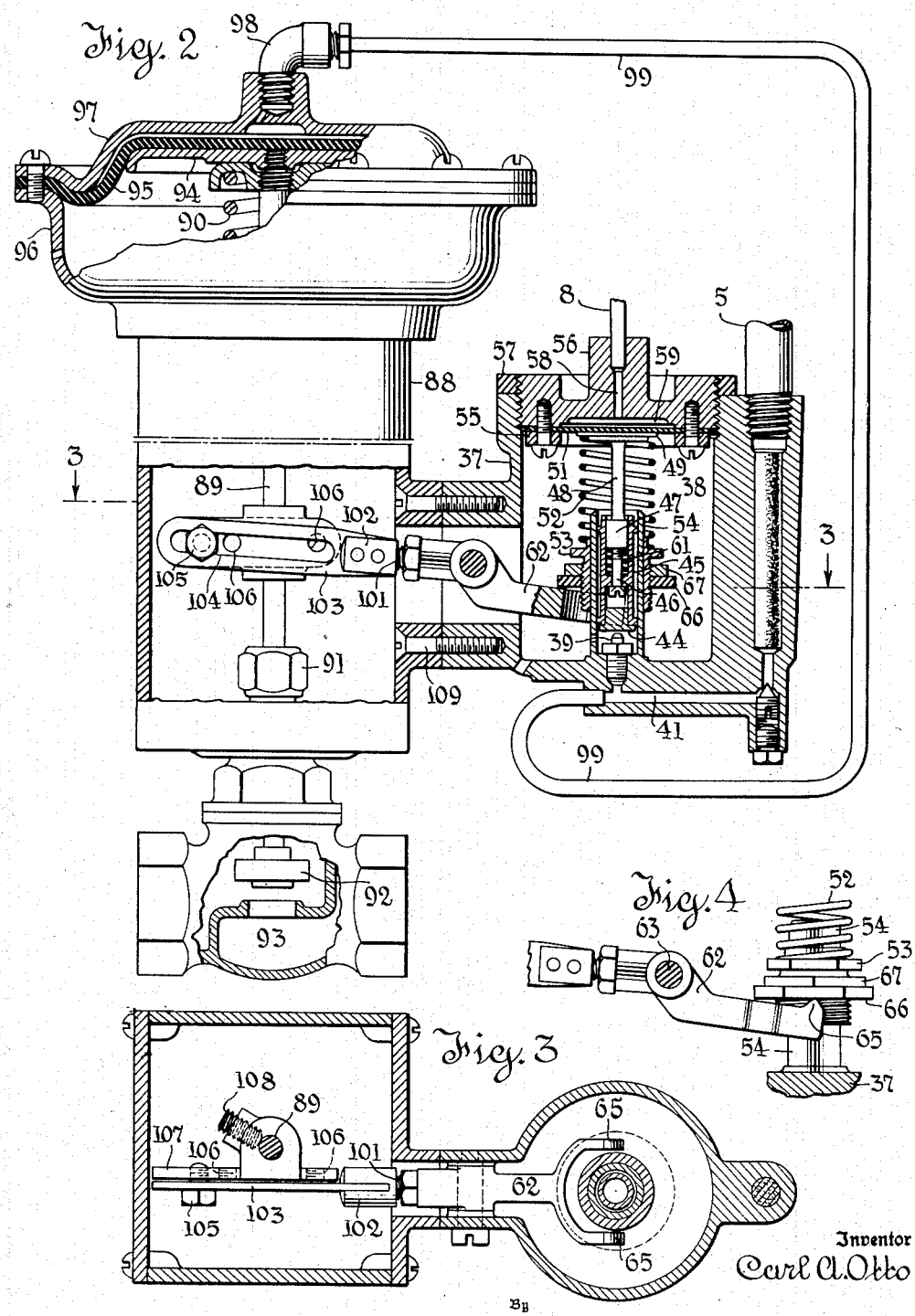

2,258,366

UNITED STATES PATENT OFFICE 2,258,366

REGULATING SYSTEM

Carl A. Otto, Milwaukee, Wis., assignor to Johnson Service Company, Milwaukee, Wis., a corporation of Wisconsin Application June 3, 1938, Serial No. 211,648

3 Claims. (Cl. 236—82)

This invention relates to regulating systems and particularly to regulating systems of the pneumatic type.

In the art of regulation as applied to temperature and humidity control, it has been the usual practice, when using a pneumatic system, to operate valve means for controlling the flow of heat exchanging media by the direct application of branch line pressure to a pressure or diaphragm motor in order to control it, the branch line pressure, serving as pilot pressure to control a throttling valve, being derived from a main source of pressure usually amounting to approximately fifteen pounds per square inch.

Proposed systems have been divided generally into two types, namely (1) those in which the leak valve throttling means controlled by pilot pressure moves about a fixed pivot and (2) those in which the leak valve throttling means moves about a movable or floating pivot. The first type is preferable because it requires a smaller range of movement of the parts and hence lends itself to use with a pressure responsive diaphragm which is cheaper, simpler, and more trouble free than are pistons, Bourdon tubes, bellows, and equivalent means which must be used in a system of type (2).

Systems of this character previously proposed can be relied upon for prompt and effective operation where exact regulation is not required. However, such systems, particularly those of type (2), have an inherent tendency to unstable operation, are adversely affected by friction of the moving parts of the apparatus to be controlled, and by forces to which the controlling valve or other controlling means is subject, and require too much apparatus. Due to the susceptibility of systems of this character to fluctuations in operating characteristics and to their complexity, hydraulic means have frequently been used to obtain stability, although such means are inherently less flexible than pneumatic systems. It has been found, however, that by utilization of certain principles herein disclosed, a system operated pneumatically can be arranged to have the flexibility and speed of operation characteristic of pneumatic systems and, at the same time, the inherent stability of hydraulic systems.

Accordingly, the main object of the present invention is to provide a regulating system of the pneumatic type which offers substantially all of the advantages of both pneumatic and hydraulic systems with a much simplified structure, and one which can be adapted directly to pneumatic systems already in use. For purposes of illustration, the invention has been described as applied to two different forms of pneumatic apparatus. It is to be understood that the illustrations made are exemplary only and not limiting.

In the drawings:

Figure 1 is a diagrammatic view of a system embodying the present invention, with parts shown in section, and disposed to operate a plurality of damper or pressure motors operating on controlling means for a heat exchanging medium;

Fig. 2 is a view partially in elevation and partially in section, illustrating an application of the invention to a modified form of heat exchange medium control;

Fig. 3 is a sectional view on line 3—3 of Fig. 2; and

Fig. 4 is a detail of a portion of the mechanism shown in both Figs. 1 and 2.

In Fig. 1 of the drawings, reference character 5 designates a line connected to a source of fluid pressure such as compressed air which, according to usual practice, will have a pressure of approximately fifteen pounds per square inch. This line has a branch 6 supplying fluid to a thermostatic device 7 which operates on the leak port principle to vary the pressure in branch line 8. The instrument 7 may, for example, be of the construction disclosed in the patent to Otto No. 1,500,260, to which reference may be had for details.

For the purposes of the present description it will be sufficient to state that the pipe 6 supplies air to a leak port 9, the lid 11 of which is controlled by a thermostat 12, or other instrument responsive to changes in an atmospheric condition, to vary the pressure in line 8 in accordance with changes in temperature, or other quantity, to which the responsive element of instrument 7 is exposed.

As here shown, the valve to be controlled is designated at 13 as of the butterfly type and may form an element of an adjustable louver for controlling the flow of a heat exchanging medium, this valve being carried on a rotatable shaft 14 mounted in suitable bearings (not shown) and adapted to be actuated by motors 15 and 16 through lever 17, links 18 and 19, and levers 21 and 22.

The motor 15, here shown as of the bellows type, may comprise a casing 23 having an upstanding bracket 24 forming a pivot support 25 for lever 21. The casing also carries a spring seat 26 supporting a spring 27 which reacts between this seat and an abutment 28 pivotally connected to the right hand end of lever 21 as at 29. The spring 27 tends to bias the lever 21 to the position shown, in which the valve 13 is in fully opened position. Disposed within the casing 23 is a bellows 31 subject to branch line pressure through pipe 32, the bellows having a head 33 supporting a bracket 34 pivoted at 35 to the lever 21 and forming a movable fulcrum for the lever.

When pressure fluid is supplied to the interior of bellows 31 and is under sufficient pressure to overcome the bias of spring 27, the arm 21 is caused to swing about the pivot 25 and thus to move the damper 13 toward closed position. The bellows motor 16 is of the same construction as the motor 15 and operates concurrently with it in order to provide sufficient power to operate the damper 13. It will be obvious that the motor 15 may operate alone to control the damper 13, in which case the link 19 would be disconnected and the line 36 to motor 16 omitted.

The apparatus so far described is characteristic of known types of systems wherein branch line pressure from the thermostat, or the like, operates directly on a damper motor to control a valve. In the present instance, however, in order to obtain stability of operation, there is interposed between the instrument 7 and the damper motor, a pilot mechanism including leak valve throttling means for regulating the pressure which is supplied to the motor.

As illustrated, the pilot valve comprises a casing 37 containing a chamber 38 within which is mounted a leak port 39 connected through duct 41, adjustable pin valve 42, and filter 43, with the line 5 to which main line pressure is supplied. Cooperating with the leak port 39 is a plug 44 carried in the lower end of a sleeve 45, this sleeve being connected by a screw 46 and interposed cushion spring 61 to the head 47 on stem 48 of plate 49. The plate 49 is held in abutting relation to a flexible diaphragm 51 by a spring 52, held in a spring seat 53 slidably carried on a tubular guide 54 secured to the casing 37. The details of this structure are shown in Fig. 4.

The diaphragm 51 is held by ring 55 against a closure member 56 screwed into the top of the housing 37 and held by locking ring 57. The closure member contains a central port 58 connected to pipe 8, and terminating at its inner end adjacent the diaphragm 51 in a chamber 59, to which pressure fluid is supplied to move the stem 48 downwardly, and to bring the plug 44 into contact with the leak port 39. The pressure in chamber 59 exerts a force which is opposed to that of spring 52. The cushion spring 61 prevents injury to the leak port 39 by excess pressure being supplied to the chamber 59. When pressure builds up in chamber 59 to move the plug 44 into contact with leak port 39, the spring 61 is compressed and limits the force transmitted to the plug 44. However, when the plug is out of contact with the leak port, the spring 61 holds sleeve 45 tightly against the head of screw 46 so that parts 44, 45, 46, 47, 48 and 49 move as a unit.

Movement of the plug 44 is correlated with the movement of the valve 13 through lever 62. This lever has a fixed pivot on casing 37 at 63, and is operatively connected to lever 17 by a pin 64. The end of lever 62 inside of casing 37 (see Figs. 3 and 4), is forked so as to embrace the abutment 53 and the tubular extension 54. Each of the forked arms has an upstanding boss 65 which contacts with and reacts against the lower face of stop ring 66 forming a part of abutment 53, and held in adjusted threaded position on it by means of locking ring 67. Movement of the arms of lever 62 carries parts 53, 66, and 67 upwardly against the force of spring 52. This lever loads the spring 52 variably but is not connected to plug 44. Downward movement of the right hand end of lever 62 is limited by an adjustable stop screw 68 carried by the casing 37, and arranged to coact with abutment 53 to coordinate the movements of valve 13 with those of plug 44 controlling the leak port 39.

The system so far described is completely operative with the duct 41 connected directly to pipe line 69 of the bellows motors 15 and 16. A considerable volume of air must, however, be dissipated through the single leak port 39. Consequently, it is preferred that, where a plurality of bellows motors are used simultaneously, as illustrated, a relay be interposed between the pilot valve and the motors in order to provide additional vents through which air may be vented from the system to speed up its operation.

Such an arrangement is shown in Fig. 1, in which the relay designated 71 is of the usual pneumatic type having two diaphragms 72 and 73 of unequal areas with a space between them vented at 74 to atmosphere. The chamber 75 formed between the outermost diaphragm 73 and the cover 76 is connected through port 77 with the duct 41. A hub 78 carried jointly by the two diaphragms and forming a communication 79 between the two diaphragms and the inner chamber 81, controls the flow of air from this chamber 81 to the space between the diaphragms, and hence to atmosphere. The end of the hub also acts against a conical admission and exhaust valve 82 of conventional type which is biased by a spring 84 to the right hand position, in which it seats at 83. The chamber 85 formed adjacent the enlarged portion of the valve is connected by duct 86 with the line 5 to which main line pressure is connected.

The chamber 81 is connected through duct 87 with the pipe line 69. It will be apparent that since the diaphragms 73 and 72 are of different cross sectional areas, the variations in pressure occurring in chamber 75 resulting from variations in pressure from duct 41 will cause an amplification of the pressure supplied through duct 86 to be made, and supplied through duct 87 to the pipe line 69, and thence to the bellows motors 15 and 16. When the pressure within chamber 75 is low enough to cause hub 78 to move away from the valve 82, pressure from chamber 81 will exhaust rapidly to atmosphere through openings 74, and thus facilitate discharge of air from the bellows of the damper motors, when the damper is being moved to open position by the springs 27.

The operation of the complete system shown in Fig. 1 is as follows:

When the temperature or other atmospheric condition affecting the instrument 7 is such that no pressure is supplied through branch line 8 to chamber 59 of the pilot valve, the parts will occupy the positions shown in the drawing in which the valve 13 is in fully opened position, and is held there by the bias of the springs 27 of the motors 15 and 16. The leak port 39 will also be vented because diaphragm 51 occupies its uppermost position. The chamber 81 will be open to atmosphere through the passage 79 in hub 78 and openings 74, and hence will afford free communication between the interior of the bellows of the two motors and atmosphere through pipe line 69. Consequently, pressure from line 5 is completely dissipated through leak port 39 and pressure from pipe 69 through openings 74.

Whenever a change in atmospheric condition occurs to require variation in the position of damper 13, the pressure in branch line 6 will change in response to instrument 7. For the purpose of explanation it will be assumed that the temperature rises, causing the instrument 7 to close the leak port 9 associated with pipe 6 and to build up the pressure in branch line 6. Diaphragm 51 will then move downwardly, carrying with it the parts 44, 45, 46, 47, 48, 49, to close the leak port and to cause the accumulation of pressure in duct 41, and hence in chamber 75 of relay 71.

When the pressure in the bellows of motors 15 and 16 builds up sufficiently to over-power the springs 27, the lever 17 will be rotated clockwise, carrying damper 13 toward closing position. This movement will rotate lever 62 in a counterclockwise direction to increase the load on spring 52. When the load on this spring increases sufficiently to balance the force exerted by branch pressure on diaphragm 51, slight upward movement of the plug 44 will occur, permitting escape of air from leak port 39 and hence a reduction in pressure in duct 41, chamber 75, and in the bellows of the motors 15 and 16. The damper 13 will then be moved toward open position until a balanced condition is reached. Whenever the instrument 7 is so affected as to change the pressure in branch line 6, the mechanism will act, in the manner just described, to move the damper 13 to a new position.

It is desirable that the position of valve 13 be directly proportional to the branch pressure created by the thermostat. A very slight movement of the plug 44 is sufficient to vary the pressure in the bellows chambers from zero to fifteen pounds, and the control is very sensitive to a slight change in the position of levers 21 and 22. The interpositioning of the pilot mechanism makes the control entirely independent of friction in the operating parts as well as of the forces applied to the damper 13 by the medium under control. Consequently, the operation is stable, regular, and takes place in a prompt and precise manner under all normal conditions of operation.

Regulating systems of the type to which this invention relates are capable of numerous applications and, in order to make the invention more clear, it will now be described as applied to the control of a valve for regulating the flow of a heat exchanging medium, either hot or cold, in which the controlling valve is biased to one position by a spring and is moved to the other position by a diaphragm motor.

Referring to Fig. 2, the reference character 88 indicates a housing containing suitable guides for a valve stem 89 passing through packing 91 to a valve head 92 controlling the flow of heat exchanging medium through a valve chamber 93. The stem 89 terminates at the top in a plate 94 which abuts against a flexible diaphragm 95 confined between the upper wall of a housing 96 and a closure cap 97. The space between the upper face of the diaphragm 95 and the closure cap 97 is connected through a fitting 98 and a pipe line 99, with the duct 41 of a pilot valve having the same construction as that just described in connection with Fig. 1. Here the relay 71 of Fig. 1 is omitted, the duct 41 being only in communication with the diaphragm chamber of the motor, and with the main line 5.

The leak port and its associated mechanism are exactly as described in connection with Fig. 1, the lever 62 having its left hand end, however, connected to the valve stem 89, as best shown in Fig. 3.

Threaded onto the left hand end of lever 62 as at 101 is a slotted support 102 in which is carried a plate 103 slotted at 104 and adapted to be secured to the valve stem 89 by an adjustable stud 105. This stud can be screwed into any one of a plurality of openings 106 in plate 107. This plate is clamped to stem 89 by set screw 108. Provision of a plurality of openings 106 permits one form of pilot valve to be employed with different types of diaphragm motors having different degrees of movement, the casing 37 of the pilot valve being arranged so that it can be attached to standard types of diaphragm casings, as shown, and by a plurality of screws 109.

The operation of the system shown in Fig. 2 is substantially that set forth in detail in connection with the system in Fig. 1. Briefly stated, variations in pressure in branch line 6 resulting from changes in an atmospheric condition, cause movement of the plug 44 toward or away from the leak port 39, thus causing pressure variations to occur in duct 41 and to be applied through line 99 to the diaphragm chamber of the diaphragm motor to regulate the position of valve head 92. Movement of the valve stem 89 in response to either the biasing spring 90, tending to open the valve, or to pressure above the diaphragm, tending to close the valve, moves the lever 62 and thus adjusts the plug 44 to either build up or dissipate pressure in duct 41, pipe 99, and the diaphragm chamber of the motor. Very slight movements of the plug 44 with respect to the leak port 39 cause considerable changes in pressure in the diaphragm chamber of the motor. Hence it becomes possible to exercise sensitive accurate control of the valve 92 without hunting, at the same time to maintain the system completely independent of the friction of the valve operating means, or of the forces to which the valve head is subject.

In the above description, the invention has been set forth as applied to the control of damper motors and diaphragm motors of two particular types. It is to be understood, however, that the particular style of motor is not vital, and that the invention can be applied to other motors of pneumatic type and the desired results obtained. Accordingly, no limitations other than those distinctly expressed in the claims are to be implied.

What is claimed is:

1. In a regulating system of the pneumatic type, means for controlling the flow of a heat exchange medium; a source of pressure fluid; a single-acting pressure motor for operating said controlling means; means for opposing movement of the controlling means by an amount which is proportional to the extent of movement of said controlling means and increases with said movement; means responsive to variations in an atmospheric condition for producing variations in pressure of fluid derived from said source; a lever having a fixed pivot; pilot valve means responsive to said pressure fluid variations, said pilot valve means including a diaphragm motor connected to said derived pressure source, a leak port connected to said source, a valve member for controlling said leak port; direct-acting means interposed between the diaphragm of said motor and said valve member and movable only along a path coaxial with said leak port; an opposing spring reacting between said diaphragm and said lever; and means for connecting the other end of said lever to said controlling means to coordinate the operation of said pressure motor and the movements of said valve member.

2. In a regulating system of the pneumatic type, means for controlling the flow of a heat exchange medium; a source of pressure fluid; a single-acting pressure motor for operating said controlling means; means for opposing movement of said controlling means by amounts increasing with the movement of said controlling means and proportional thereto; means responsive to variations in an atmospheric condition for producing variations in pressure of fluid derived from said source; pilot valve means responsive to said pressure fluid variations, said pilot valve means including a housing carrying a lever pivoted thereon, a diaphragm motor connected to said derived pressure source, a leak port connected to said source, and a valve member for controlling said leak port, said member being connected directly to the diaphragm of said diaphragm motor; a guide for the valve member, said guide being carried by said housing in axial alignment with the axis of movement of said valve member; a spring seat movable on said guide and resting on one end of said lever; a spring on said seat and arranged to react between said lever and the pressure exerted on said diaphragm in a leak port closing direction; and means connecting the other end of said lever to said controlling means for coordinating the operation of the pressure motor and the movements of said valve member.

3. In a regulating system of the pneumatic type, means for controlling the flow of a heat exchange medium; a single-acting pressure motor for operating said controlling means, means for opposing movement of said controlling means by a force which increases with the displacement of the controlling means; a source of fluid under pressure; means responsive to variations in an atmospheric condition for producing variations in pressure of fluid derived from said source; a lever having a fixed pivot; a pilot valve means responsive to said pressure fluid variations, said pilot valve means including a unit made up of a diaphragm motor connected to said derived pressure source, a leak port connected to said source, a valve member for controlling the leak port, said member being connected directly to said diaphragm motor, and to said lever; means positioned between said diaphragm and leak port for causing rectilinear movement of said valve member and its actuating means toward and away from said leak port; a spring seat resting on one end of said lever; a spring resting on said seat and reacting against said diaphragm in opposition to the fluid pressure; an operative connection between the other end of said lever and said controlling means for coordinating the movements of said motor and said member; and a resilient connection interposed directly between said valve member and its operative connection to the diaphragm to limit the pressure applied to the valve member.

CARL A. OTTO.